(12) United States Patent
Schafer et al.

(10) Patent No.: US 7,153,066 B2
(45) Date of Patent: Dec. 26, 2006

(54) CUTTING PLATE FOR A PROCESSING TOOL AND HOLDING DEVICE FOR SUCH A CUTTING PLATE

(75) Inventors: Hans Schafer, Gomaringen (DE); Matthias Oettle, Riederich (DE)

(73) Assignee: Hartmetall-Werkzeugfabrik Paul Horn GmbH, Tügingen (DE)

( * ) Notice: Subject to any disclaimer, the term of this patent is extended or adjusted under 35 U.S.C. 154(b) by 19 days.

(21) Appl. No.: 10/512,469

(22) PCT Filed: Aug. 2, 2002

(86) PCT No.: PCT/EP02/08606

§ 371 (c)(1),
(2), (4) Date: Oct. 26, 2004

(87) PCT Pub. No.: WO03/097281

PCT Pub. Date: Nov. 27, 2003

(65) Prior Publication Data

US 2005/0232710 A1 Oct. 20, 2005

(30) Foreign Application Priority Data

May 22, 2002 (DE) ................................ 102 22 445

(51) Int. Cl.
*B26D 1/12* (2006.01)
(52) U.S. Cl. ........................................... 407/30; 407/47
(58) Field of Classification Search .................. 407/30, 407/113, 114, 115, 116, 47
See application file for complete search history.

(56) References Cited

U.S. PATENT DOCUMENTS

| 2,936,659 | A | * | 5/1960 | Garberding | ................... 407/31 |
| 3,091,138 | A | * | 5/1963 | Berry, Jr. | ..................... 408/232 |
| 4,929,131 | A | * | 5/1990 | Allemann | .................... 409/234 |
| 5,607,263 | A | * | 3/1997 | Nespeta et al. | ................ 407/61 |

FOREIGN PATENT DOCUMENTS

| DE | 3402547 A1 | 8/1985 |
| DE | 34 48 086 C2 | 12/1991 |
| DE | 197 01 555 A1 | 7/1998 |
| FR | 864432 A | 4/1941 |
| WO | WO 01/45883 A2 | 6/2001 |

* cited by examiner

*Primary Examiner*—Willmon Fridie, Jr.
(74) *Attorney, Agent, or Firm*—Roylance, Abrams, Berdo & Goodman, L.L.P.

(57) ABSTRACT

A cutting plate for a processing tool, particularly a milling tool, is connected to a holding device for such a cutting plate. The cutting plate has at least one blade (1) configured in a radially protruding manner on a central body (5) of the cutting plate. The central body (5) is provided with a coupling part for mounting the cutting plate on a frontal seat of a shaft-type holding device (15) which defines a longitudinal axis. The coupling part forms at least one driving surface transmitting an operating torque from the holding device (15) to the cutting plate. The cutting plate also includes a shaped part which forms a fixing device on the seat (17) of the holding device (15) in cooperation with an associated embodiment (35).

14 Claims, 3 Drawing Sheets

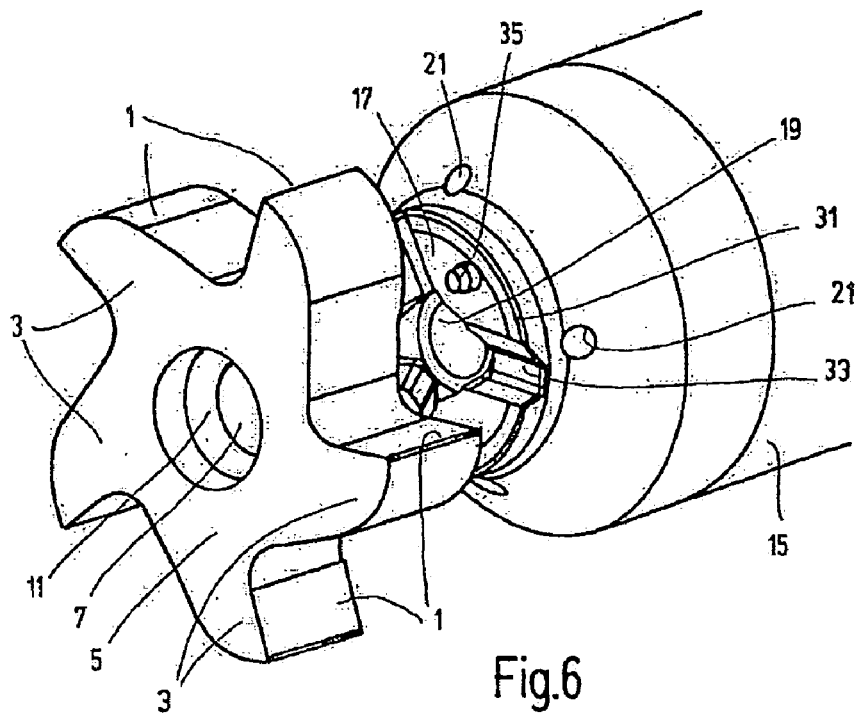
Fig.6
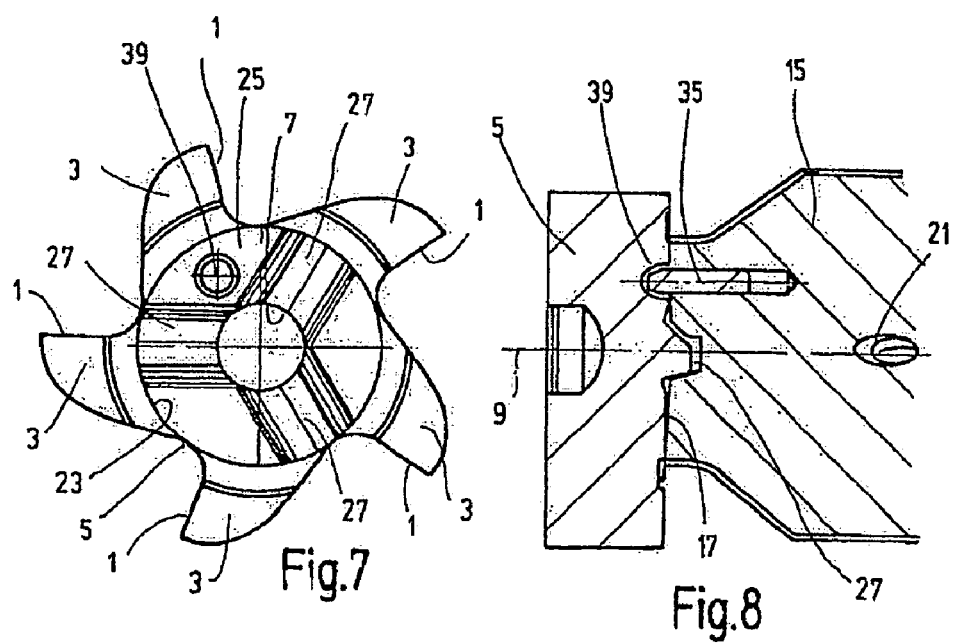
Fig.7
Fig.8

CUTTING PLATE FOR A PROCESSING TOOL AND HOLDING DEVICE FOR SUCH A CUTTING PLATE

FIELD OF THE INVENTION

The present invention relates to a cutting plate for a processing tool, a milling tool in particular, having at least one cutting edge configured to project radially from a central body of the cutting plate. This central body has, for the purpose of mounting the cutting plate on a frontal seat of a shaft-like holding device defining a longitudinal axis, a coupling component forming at least one driving surface for transferring operating torque from the holding device to the cutting plate. A boring in the central body is concentric with the axis of rotation and is designed to secure the cutting plate axially in the seat of the holding device.

BACKGROUND OF THE INVENTION

Cutting plates which, together with a shaft-like holding device connected to a drive spindle or to a non-rotating machine support which may be controlled to execute adjustment movements, form a rotating or non-rotating machine tool. DE 34 48 086 C2, for example, discloses a tool of this kind for inside machining. Such tools are widely used for machining processes which must be executed with high precision. To ensure adherence to correspondingly narrow tolerances, it is extremely important to achieve strict coordination of cutting plate and the holding device corresponding to it. In other words, care must be taken to make certain that a particular holding device only mounts cutting plates having bodies with coupling components adapted with precision to the geometry of the seat on the holding device. Consequently, to ensure optimal machining results, the user must take great care to ensure that the only cutting plates used with a given holding device are ones which belong to an associated type classification meeting the corresponding specifications provided by the manufacturer for the cutting plate and the holding device. Even if the user does pay careful attention to this point, the possibility nevertheless exists that cutting plates not provided or intended for use with a particular holding device may be mounted on an inappropriate holding device.

SUMMARY OF THE INVENTION

An object of the present invention is to provide a cutting plate for which it is ensured that only a desired optimal combination of the cutting plate and a holding device will be formed.

With the present invention, this object is attained by a cutting plate having a structural part which forms a non-interchangeability mechanism in conjunction with an associated configuration on the seat of the holding device.

This structural part necessarily makes certain that the only cutting plates which may be mounted on a given associated holding device are ones with that specific structural part typifying the specification and forms part of the non-interchangeability mechanism.

In the case of cutting plates in which the coupling component has, as has already been disclosed, carrier components can be in the form of ribs projecting axially from the components. The ribs extend radially on the driving surface for the transfer of torque. The structural part for the non-interchangeability mechanism may be configured on one of those ribs.

For example, a recess provided in the form of a flattening of the respective rib may be provided as structural part of the non-interchangeability mechanism.

A recess positioned on the cutting plate in an area between two ribs may be provided alternatively as a structural part of the non-interchangeability mechanism.

Another object of the present invention is to provide a holding device for cutting plates with a configuration provided on the seat for the cutting plate forming a non-interchangeability mechanism on the body of the cutting plate in conjunction with a structural part.

In one preferred exemplary embodiment, this configuration may be in the form of an axial projection on the seat for the cutting plate. The projection extends, when an associated cutting plate is mounted, into a recess made in the cutting plate body. A recess is provided on the cutting plate as a structural part of contact of the non-interchangeability mechanism.

The axial height of the projection preferably is somewhat smaller than the depth of the recess in the associated cutting plate. The projection, which for example is in the form of an axially projecting pin on the seat of the holding device, on its outer end, does not form a part of the surface of the seat and the cutting plate.

If the recess provided for engagement of the pin on the body of the cutting plate is in the form of a pocket bore, this bore preferably is dimensioned so that clearance is also obtained between the side walls of the pin and the pocket bore. Accordingly, the pin may be seated in the pocket bore without coming in contact with the body of the cutting plate.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 6 is an enlarged, partial and exploded perspective view of a milling tool according to a second embodiment of the present invention;

FIG. 7 is a bottom plan view of the cutting plate of the milling tool of FIG. 6 viewed in the direction of the side of the cutting plate forming the coupling component; and FIG. 8 is a side elevational view of the milling of FIGS. 6 and 7 in section.

DETAILED DESCRIPTION OF THE INVENTION

Figure 1:
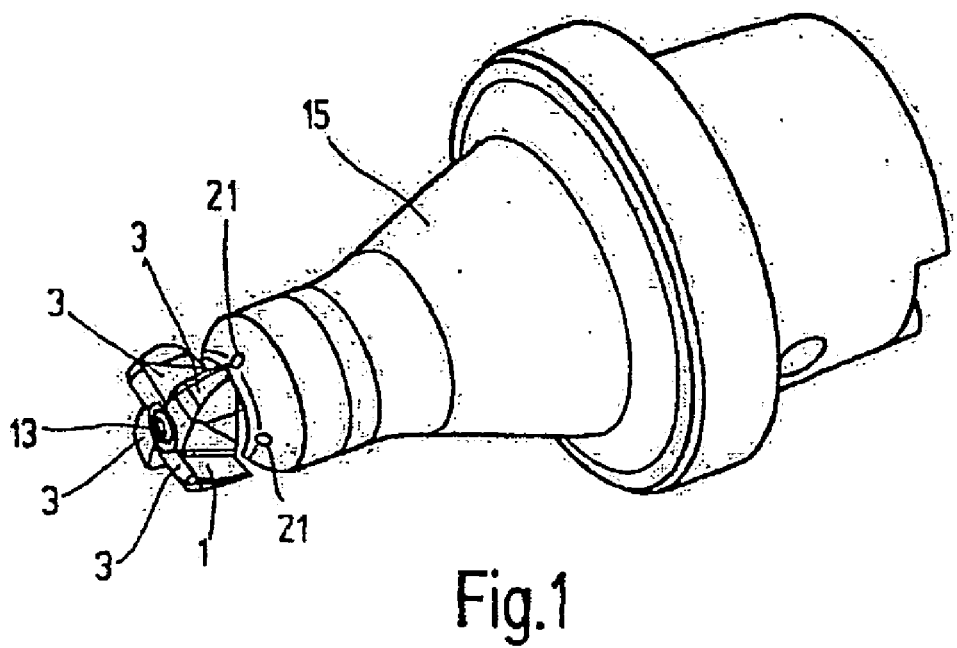
FIG. 1 is a perspective view of a milling tool having a cutting plate with four cutting edges according to a first embodiment of the present invention.

In the first exemplary embodiment illustrated in FIGS. 1 to 5, a rotating milling tool has a machining axis of rotation 9. The cutting plate has four cutting edges 1 provided on the components 3 projecting radially from the body 5 of the cutting plate. The cutting edges are displaced through an angle of 90° relative to one other. The body 5 of the cutting plate has a central bore 7 concentric with the machining axis of rotation 9, and has a boring section in the form of a tapering surface 11 (FIG. 2) widening toward the exterior. A fastening screw 13, shown only in FIG. 1, has a conical section fitting on the tapering surface 11. The cutting plate may be screw-fastened by the screw at its rear surface to a holding device 15 in the form of a milling cutter shaft. The holding device 15 has, on its frontal surface, a seat 17 for the cutting plate. In the center of the seat, a bore 19 is concentric with the machining axis of rotation 9, and is provided with internal threading for the fastening screw 13. In its interior, the shaft of the holding device 15 has flow channels for delivery of coolants/lubricants which are discharged by way of apertures 21 distributed over the circumference of the seat 17.

Figure 4:
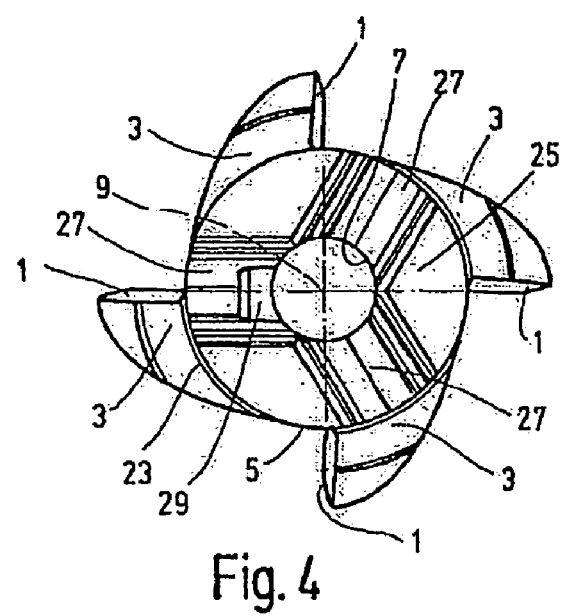
FIG. 4 is a bottom plan view of the cutting plate of the first embodiment in the direction of the side of the cutting plate forming the coupling component.

As shown particularly in FIG. 4, the body 5 of the cutting plate forms, on the side provided for mounting in the seat 17 of the holding device 15, a coupling component 23 with a circular end face 25 extending perpendicularly to the axis of rotation 9. Three ribs 27 extend axially from the plane of the end face 25, and enclose equal central angles relative to each other. These ribs 27 extend radially from the bore 7 to the circumference of the end face 25. Each rib 27 forms, on one of its side flanks, a driving surface for transfer of drive torque from the holding device 15 to the cutting plate. One of the ribs 27, in the example illustrated in rib 27 positioned on the left in FIG. 4, has on its upper side a flattened part 29 forming on the upper surface of this rib 27 a recess which adjoins the bore 7. The recess formed by the flattened part 29 forms a structured part which forms a non-interchangeability mechanism in conjunction with a corresponding configuration provided on the seat 17 of the holding device 15.

Figure 2:
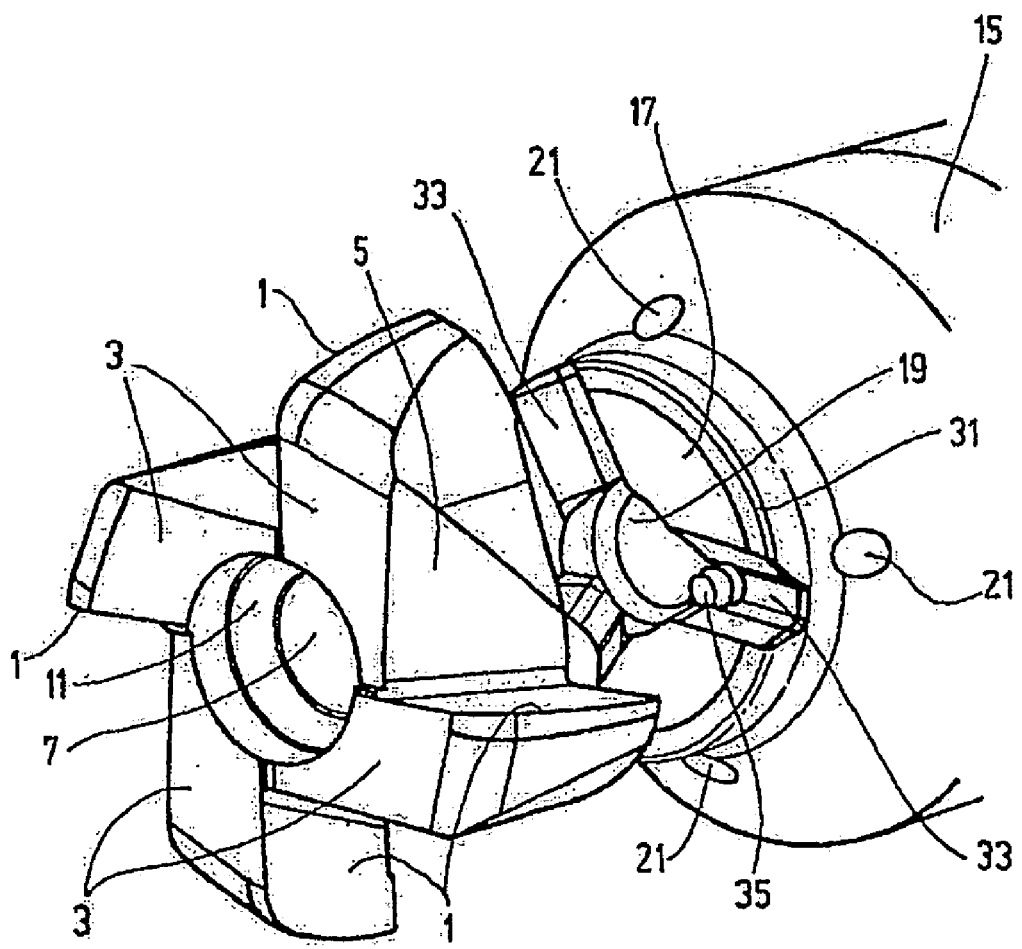
FIG. 2 is an enlarged, partial and exploded perspective view of the front end area of the milling tool of FIG. 1, the cutting plate being shown raised from the seat of the holding device.
Figure 3:
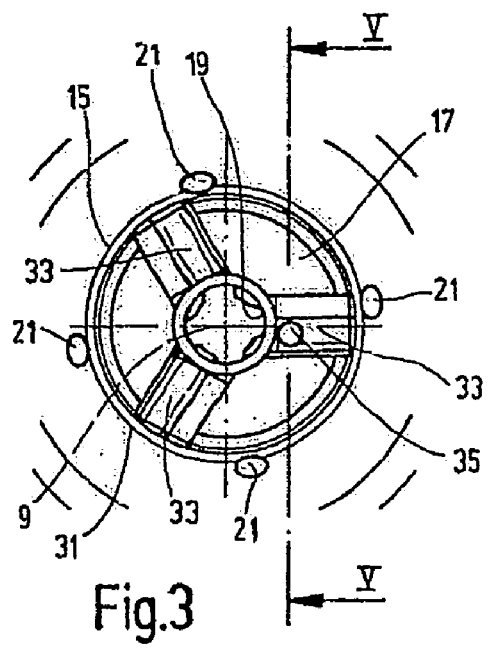
FIG. 3 is a top plan view of the seat of the holding device of the milling tool of FIG. 1 on a scale smaller than that of FIG. 2.

As is to be seen in FIGS. 2 and 3, a rib-like annular surface 31 projects a short distance axially on the circumference of the seat 17 of the holding device 15. If the cutting plate is mounted on the seat 17 of the holding device 15, the end face 25 of the cutting plate is separated by a short distance from the annular surface 31. As is shown the most clearly in FIG. 2, grooves 33 in the frontal surface of the seat 17 are formed to complement ribs 27 on the coupling component 23 of the cutting plate. These ribs are seated in these grooves when the cutting plate is pressed against the holding device 15 by the screw 13. Support of the cutting plate and transfer of torque resulting from contact of the flanks of the ribs 27 with associated wall areas of the grooves 33. A small amount of clearance remains, as has already been pointed out, between the circumferential annular surface 31 and the end face 25.

Figure 5:
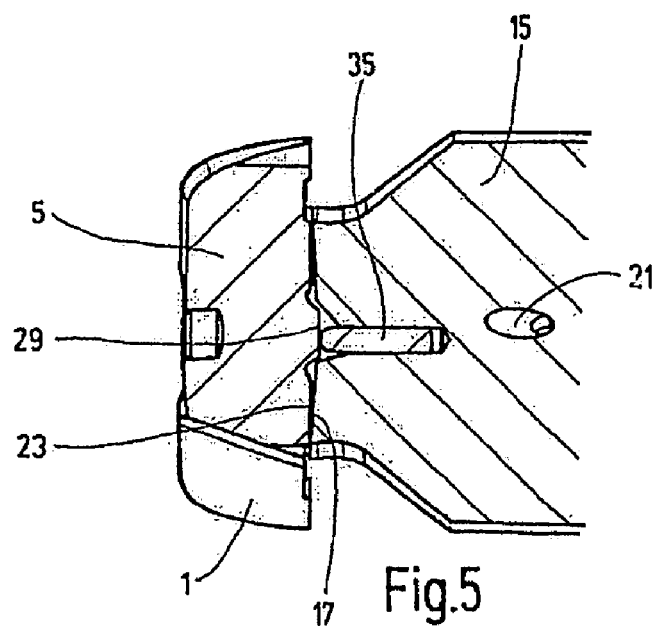
FIG. 5 is a side elevational view of the milling tool of FIG. 1 in a section taken along line V—V in FIG. 3.

FIGS. 2 and 3 show a pin 35 extending axially from the bottom of one of the grooves 33. In FIG. 3, this one groove 33 is positioned on the right. As shown in FIG. 5, the pin 35 extends into the recess formed in the body 5 of the cutting plate by the flattened part 29 of the associated rib 27 when the cutting plate is mounted on the seat 17 of the holding device. The axially measured height of the pin 35 and depth of the rib 27 formed by the flattened part 29 are dimensioned so that the pin 35 ends with a small amount of clearance between it and the flattened part 29. Consequently, the end of the pin 35 does not form a part of the surface of contact of the body 5 of the cutting plate with the seat 17 of the holding device 15. The mutual local and dimensional association of the components on cutting plate and holding device forming the non-interchangeability mechanism, specifically, the structural part on the cutting plate formed by the flattened part 29 and the configuration of the seat 17 of the holding device 15 with a pin 35 projecting in the direction of the flattened part 29, forces formation of a failsafe device preventing the mounting of a "wrong" cutting plate on a holding device which is provided and configured exclusively for use of special cutting plates.

Structural parts other than the flattened part 29 shown and the projecting pin 35 could, of course, be provided on the holding device. Other configurations on the seat of the holding device forming the desired non-interchangeability effect could, of course, be provided.

FIGS. 6 to 8 show a second exemplary embodiment with a modified configuration of the non-interchangeability mechanism. As in the first exemplary embodiment, a pin 35 projecting from the seat 17 of the holding device 15 is provided as a component of the non-interchangeability mechanism associated with the holding device 15. Unlike the example first described, however, the pin 35 does not extend from the bottom of one of the grooves 33, but rather is positioned on the seat 17 in the area between two grooves 33. The recess provided for mounting of the pin 35 on the body 5 of the cutting plate accordingly is not provided as a flattened part of a rib 27, but is rather configured as a pocket bore 39 positioned between two ribs 27 on the coupling component 23.

As is seen in FIG. 8, the pin 35 and the pocket bore 39 are dimensioned with respect both to their axial extent and their thickness or width so that there is a gap on all sides between the surface of the pin 35 and the surface of the inside of the pocket bore 39. As FIG. 8 shows, the pin 35 is introduced into the pocket bore 39 without coming into contact with the body 5 of the cutting plate.

The present invention has been described with reference to the example of rotating milling tools. The present invention could also be applied to a non-rotating tool, such as a tool having a cutting edge on the cutting plate for inside machining of a rotating workpiece.

While various embodiments have been chosen to illustrate the invention, it will be understood by those skilled in the art that various changes and modifications can be made therein without departing from the scope of the invention as defined in the appended claims.

What is claimed is:

1. A cutting tool, comprising:
   a shaft holding device having a frontal seat with grooves therein;
   a cutting plate having a central body and at least one cutting edge projecting radially from said central body;
   a coupling component defining a longitudinal axis, mounting said cutting plate on said frontal seat of said holding device, having at least one driving surface transferring operating torque from said holding device to said cutting plate and having three ribs with said driving surface, said ribs projecting axially from said central body, enclosing equal central angles relative to one another, extending radially and being complementary to said grooves in said frontal seat;
   a bore in said cutting plate concentric with said longitudinal axis for receiving a screw to secure said cutting plate to said frontal seat of said holding device; and a structural part on said cutting plate forming a non-interchangeability mechanism with an associated configuration on said frontal seat of said holding device.

2. A cutting tool according to claim 1 wherein one of said structural part and said associated configuration comprises a recess extending in an axial direction.

3. A cutting tool according to claim 1 wherein said structural part comprises a recess formed by a flattened part of one of said ribs.

4. A cutting tool according to claim 1 wherein said structural part comprises a recess extending in an axial direction and being positioned between two of said ribs.

5. A cutting tool according to claim 1 wherein said associated configuration comprises an axial projection on said frontal seat, and said structural part comprises a recess receiving said axial projection.

6. A cutting tool according to claim 5 wherein said axial projection has an axial extent less than an axial depth of said recess.

7. A cutting tool according to claim 6 wherein said axial projection comprises a pin extending axially from said frontal seat parallel with said longitudinal axis.

8. A cutting tool according to claim 7 wherein said pin has smaller axial length and thickness than said recess allowing said pin to be received in said recess without contacting said central body.

9. A cutting tool, comprising:
a shaft holding device having a frontal seat with grooves therein;
a cutting plate having a central body and at least one cutting edge projecting radially from said central body;
a coupling component defining a longitudinal axis, mounting said cutting plate on said frontal seat of said holding device and having at least one driving surface transferring operating torque from said holding device to said cutting plate;
a bore in said cutting plate concentric with said longitudinal axis for receiving a screw to secure said cutting plate to said frontal seat of said holding device;
a structural part on said cutting plate forming a non-interchangeability mechanism with an associated configuration on said frontal seat of said holding device; and
one of said structural part and said associated configuration comprises a recess extending in an axial direction, and the other of said structural part and said associated configuration comprises an axial projection received in said recess.

10. A cutting tool according to claim 9 wherein said structural part comprises said recess, extends in an axial direction and is positioned between two ribs projecting axially from said central body.

11. A cutting tool according to claim 9 wherein said axial projection is on said frontal seat, and said recess is on said central body.

12. A cutting tool according to claim 9 wherein said axial projection has an axial extent less than an axial depth of said recess.

13. A cutting tool according to claim 9 wherein said axial projection comprises a pin extending axially parallel with said longitudinal axis.

14. A cutting tool according to claim 13 wherein said pin has smaller axial length and thickness than said recess allowing said pin to be received in said recess without contacting surfaces defining said recess.

* * * * *